Aug. 24, 1943.  H. G. BARRETT  2,327,757
METHOD OF RAISING SPINES
Original Filed Feb. 9, 1940   7 Sheets-Sheet 6
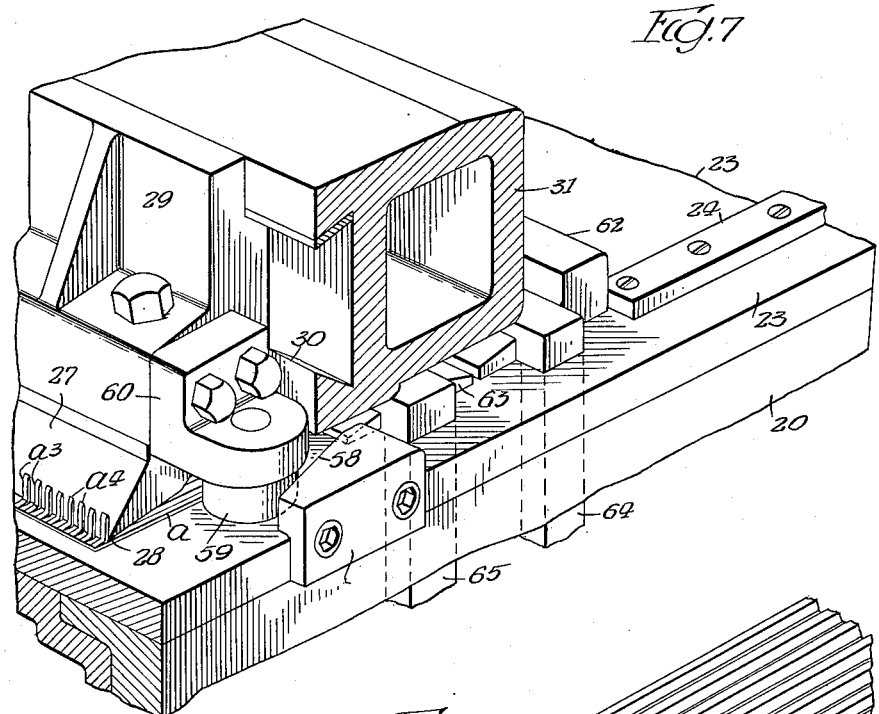
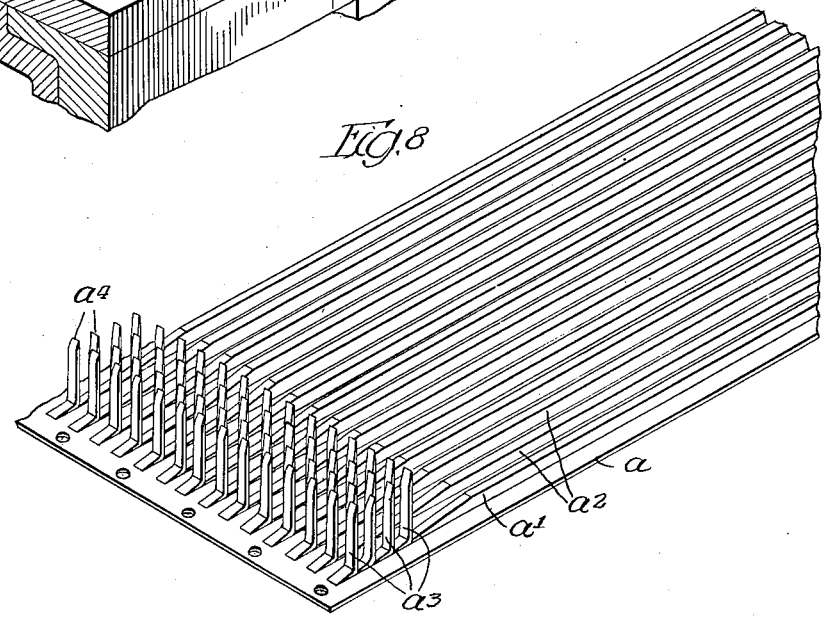
Inventor:
Harold G. Barrett
By Fred Gerlach
his Atty

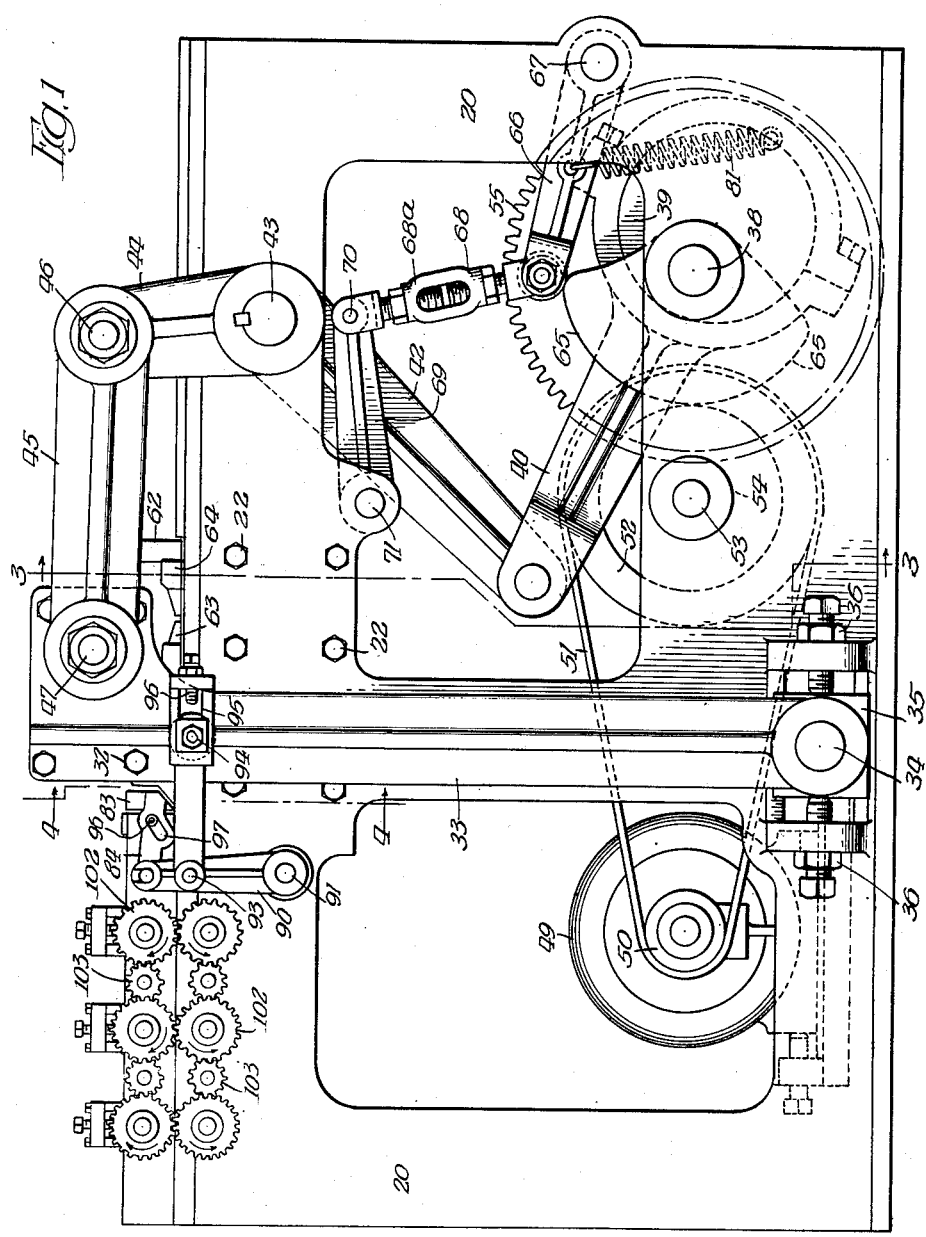

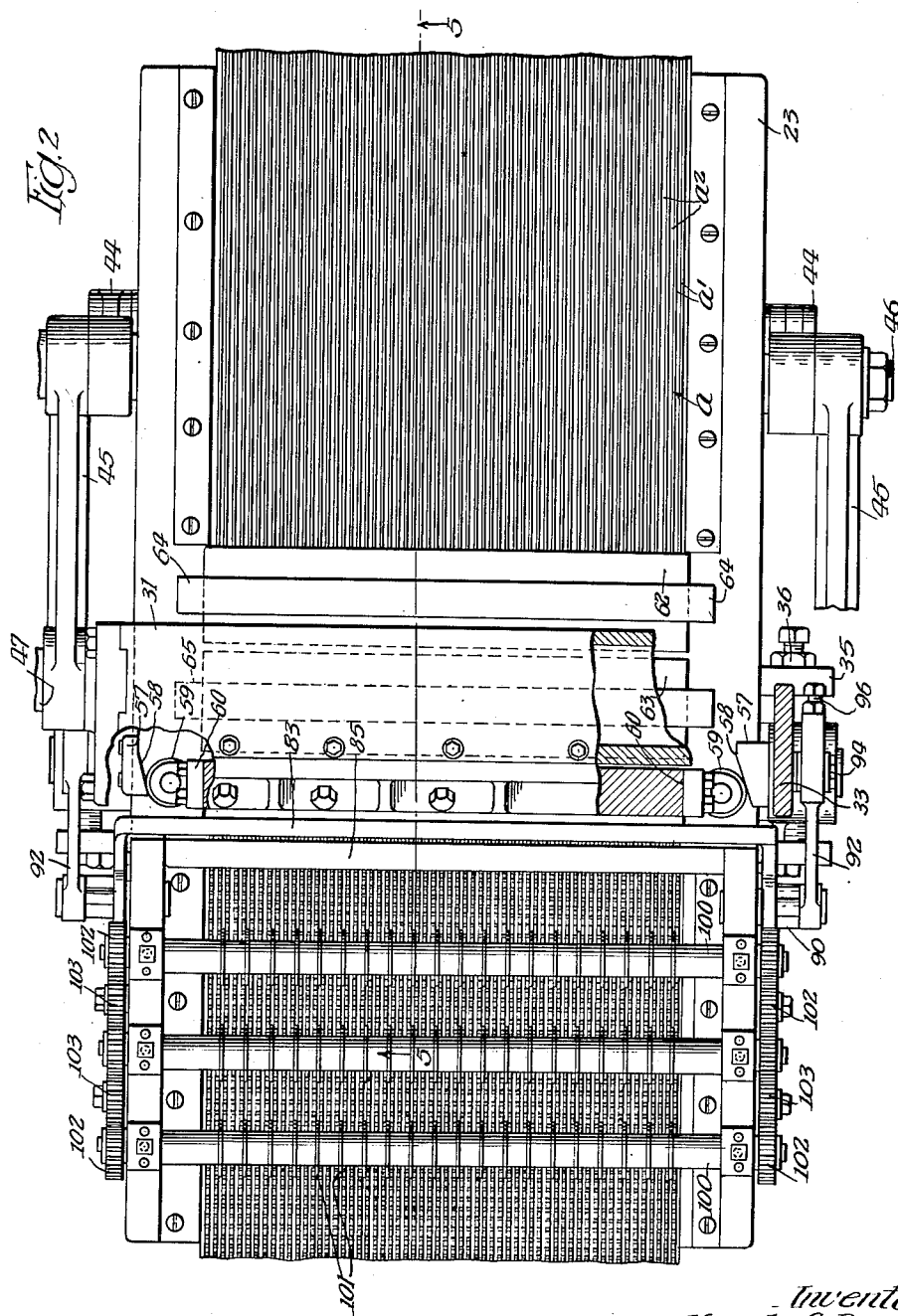

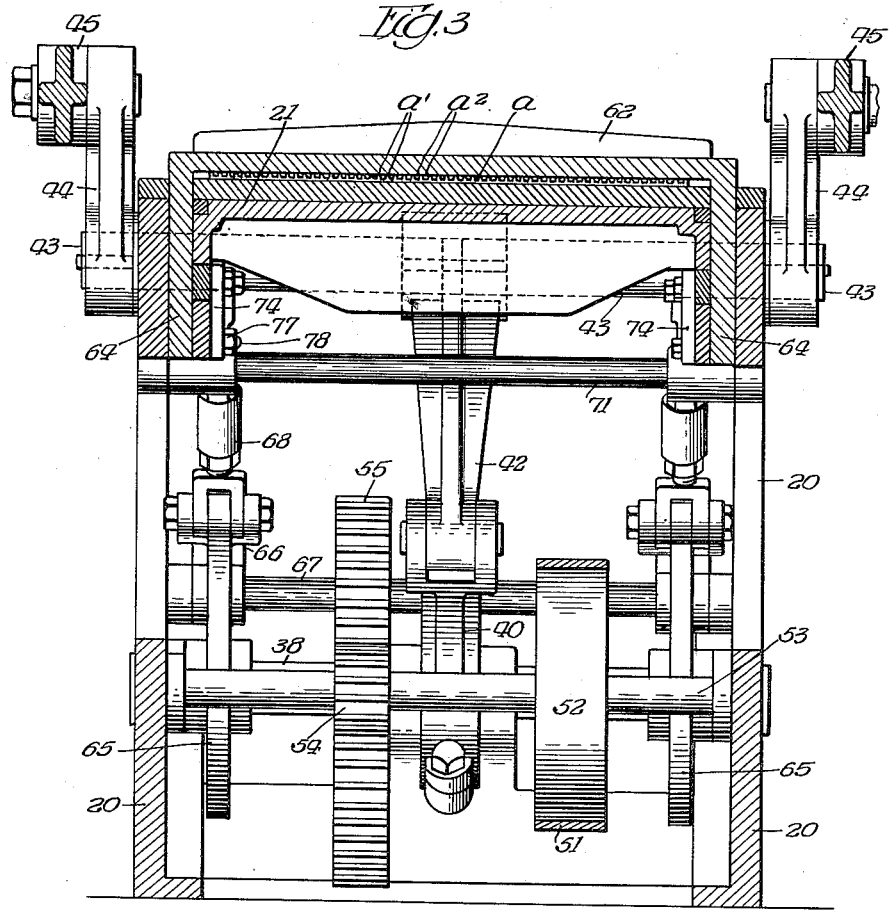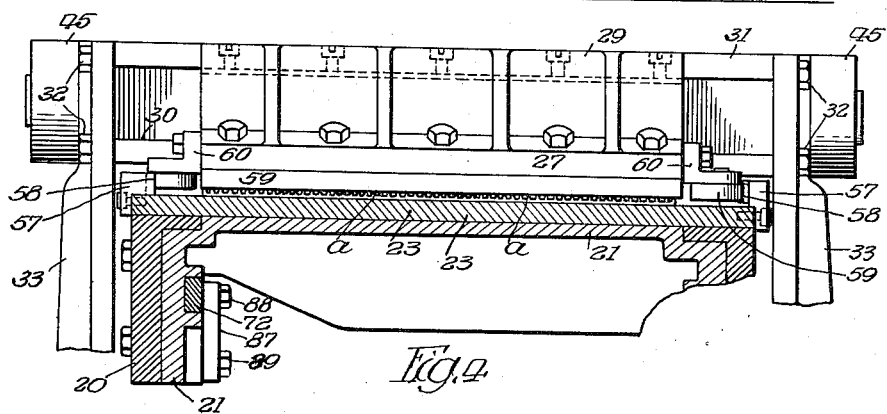

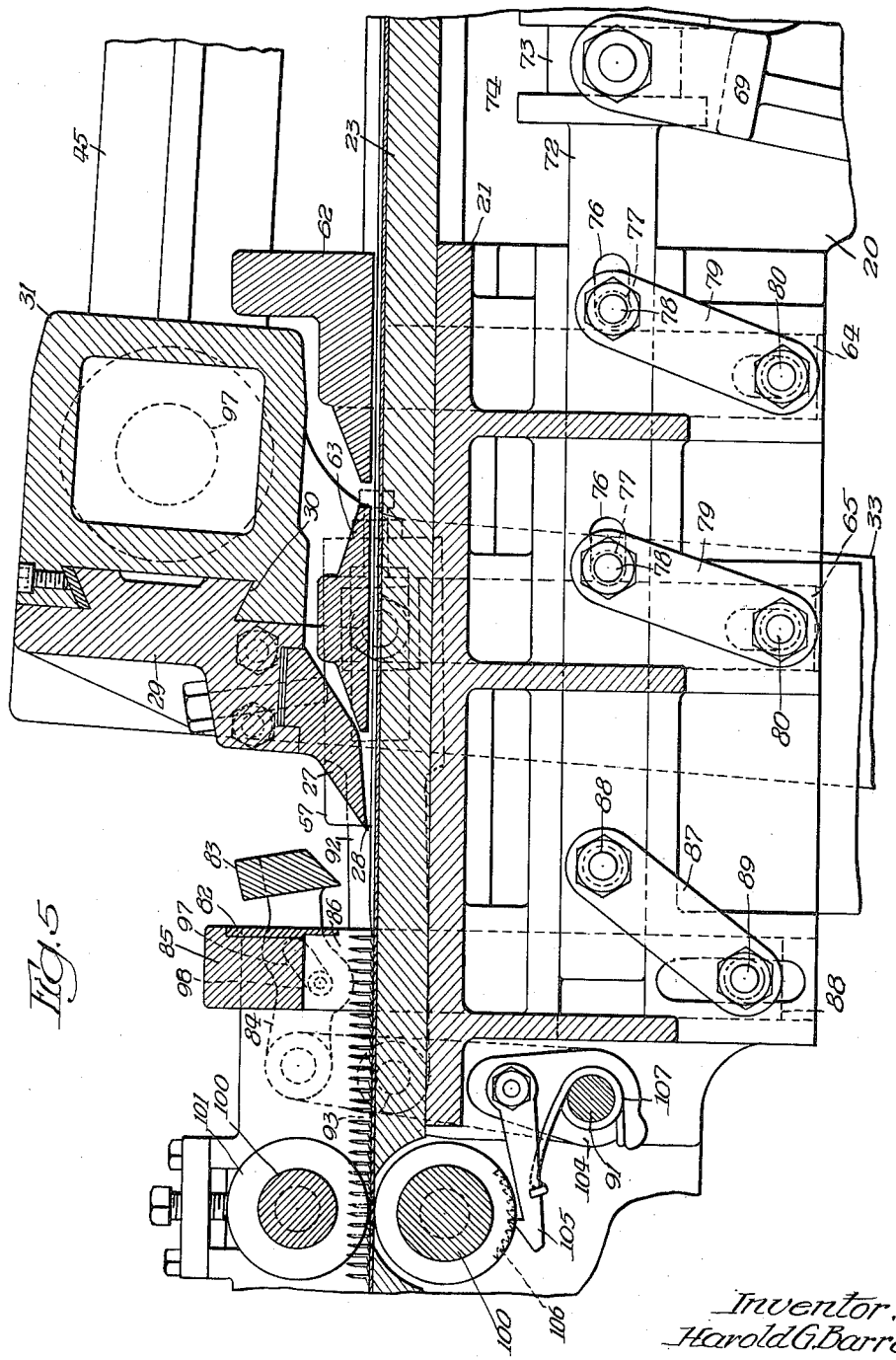

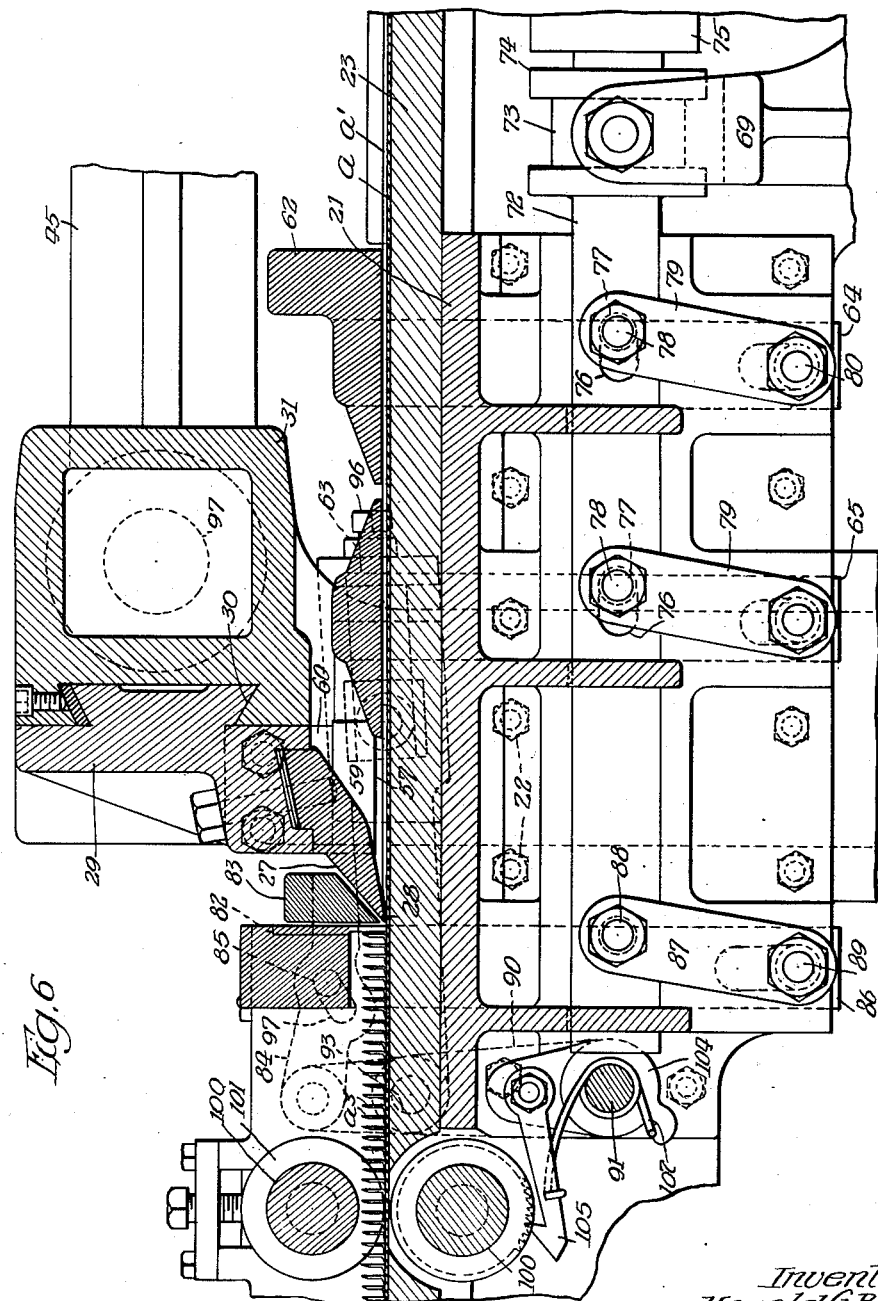

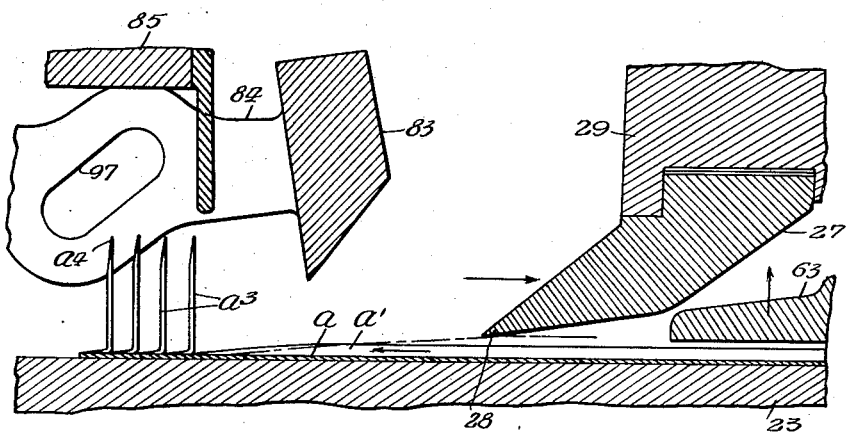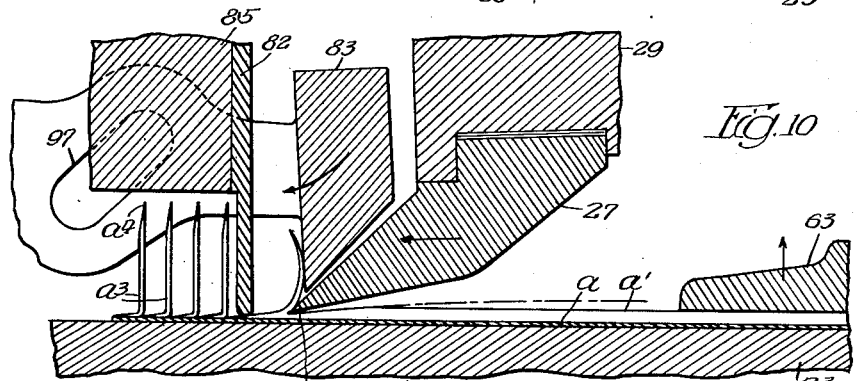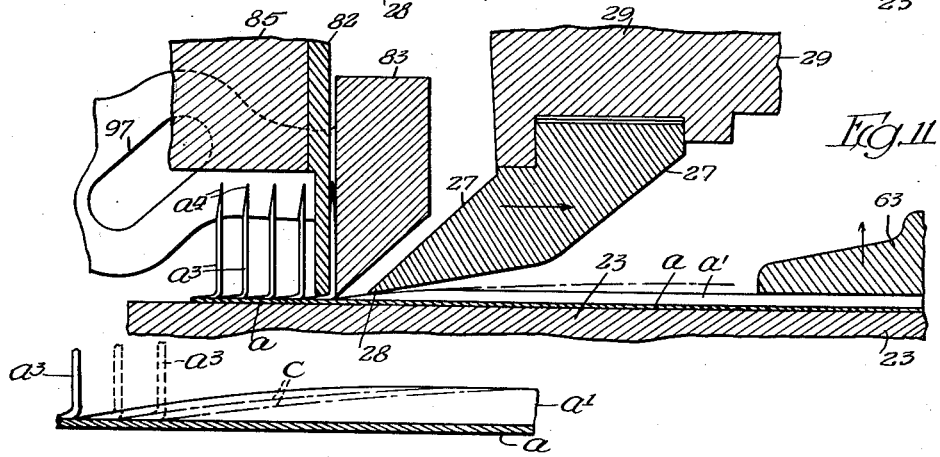

Patented Aug. 24, 1943

2,327,757

UNITED STATES PATENT OFFICE 2,327,757

METHOD OF RAISING SPINES

Harold G. Barrett, Chicago, Ill., assignor to Thermek Corporation, Chicago, Ill., a corporation of Delaware Original application February 9, 1940, Serial No. 318,097. Divided and this application October 28, 1940, Serial No. 363,119

4 Claims. (Cl. 29—157.3)

The invention relates to the fabrication of stock with integral spines for heat-transfer elements.

One object of the invention is to provide a method of producing sheets with integral spines for use in heat transfer elements and for the commercial production of such elements.

Another object of the invention is to provide a method of raising spines from a sheet of ribbed stock.

Other objects of the invention will appear from the detailed description.

The invention consists in the several novel features which are hereinafter set forth and are more particularly defined by claims at the conclusion hereof.

In the drawings: Fig. 1 is a side elevation of a machine for practicing the improved method and embodying the invention. Fig. 2 is a plan, parts being shown in section. Fig. 3 is a vertical transverse section taken on line 3—3 of Fig. 1. Fig. 4 is a section taken on line 4—4 of Fig. 1. Fig. 5 is a longitudinal section illustrating the spine-cutting and shaping mechanism in the positions assumed at the commencement of a cutting stroke. Fig. 6 is a longitudinal section illustrating the spine-cutting and shaping mechanism at the end of a cutting stroke. Fig. 7 is a perspective, parts being shown in section, illustrating the mechanism for operating the cutter transversely of the ribs on the sheet of stock. Fig. 8 is a perspective of a sheet of stock after the spines have been raised on a portion thereof. Figs. 9, 10, and 11 are detail longitudinal sectional views illustrating the spine-cutting and shaping mechanism in successive positions assumed. Fig. 12 is an enlarged section of stock illustrating the lines of successive cuts through the ribs on the stock in forming the spines.

In carrying out the method, a sheet of metal stock is used which is provided with an imperforate thin web $a$ and integral longitudinal ribs $a^1$ with intermediate grooves $a^2$ which are parallel and extend from end to end of the sheet. The sheet may be of any desired length and of any suitable metal. Rows of spines $a^3$ are successively cut from the stock in the ribs $a^1$ and raised or shaped to form extended surfaces on the sheet for heat-transfer. The ribbed stock is preferably produced by rolling the metal to form the grooves and ribs on the sheet. The sides of the ribs are upwardly convergent. The spines are produced by cuts extending transversely across the ribs and bending the slivers upwardly to project transversely from the sheet to provide heat-transfer members of a high ratio of exposed area to the mass. The cuts commence at the top face of the ribs and gradually extend to the bottom of the ribs and, as the cut continues, the slivers are curved or bent upwardly and then shaped to extend substantially at right angles to the web of the sheet. The tips of the spines are pointed, as at $a^4$. As an example of a wall of high heat-transfer efficiency, the web $a$ may be $\frac{3}{32}''$ in thickness and ribs $\frac{3}{32}''$ across the base are cut and shaped into spines $\frac{1}{32}''$ in thickness and $\frac{3}{4}''$ in length. In the finished heat-exchange element the side-faces of the spines are substantially parallel so that uninterrupted channels for the flow of fluid will be provided between the rows of spines. The web $a$ of the sheet will be continuous and imperforate so that it may be used to form a wall or partition of any conduit or body through, or around, which fluid passes for heat-exchange purposes. The web $a$ of the element is usually comparatively thin so that the element may be flexed or worked into different shapes of heat-exchange elements for different purposes.

The machine, exemplifying one for carrying out the method, comprises a suitable frame composed of sides 20 and a cross-member 21 rigidly secured to the sides by bolts 22. A flat work-supporting bed 23 extends across the top of, and is rigidly secured to, side-frames 20, and extends across the top of cross-member 21 and is adapted to rigidly support the sheet to be fabricated. The plain face of the web $a$ is placed on, and is fed over, the work-supporting plate 23 and between guide-strips 24 on the top of said plate, so that the ribbed face will be on top. This work-plate serves to rigidly support the stock throughout its entire area during the fabrication of the spined element.

A cutter-blade 27 is movable over the top of the sheet and is provided with a cutting edge 28 at its front, which is adapted to simultaneously cut spines from all of the ribs on the sheet $a$. The cutter is operated to travel longitudinally of the entire series of ribs to cut across and transversely through the tops thereof and at a slight angle to the plane of the sheet $a$, as illustrated in Fig. 12, to cut thin slivers of greater length than the spacing between the roots of the spines and is also operated transversely of the ribs to produce a shearing action of the blade across the ribs. The cutter-blade 27 is removably mounted for replacement in a slidable cross-head 29 which is transversely slidable in a dovetailed guide 30 in a carrier 31. Carrier 31 is rigidly secured by bolts 32 in, and supported by, a pair of vertical arms 33, the lower ends of which are fulcrumed on trunnions 34, so that the blade 27 will swing in an arc of long diameter. Said trunnions are carried by blocks 35, which are slidably adjustable in the frame-sides 20 and adapted to be secured in assigned position by set-nuts 36, so that the fulcrum about which the carrier 31, cross-head 29, and knife 27 are operated, may be adjusted to slightly vary the stroke of the cutting-edge relatively to the ribs to be cut. Arms 33 are shifted on their fulcrums to operate knife 27, cutter-head 29 and carrier 30 back and forth by mechanism which comprises a cross-shaft 43 journaled in frame-sides 20 and to which arm 42 is fixed, arms 44, keyed to the ends of shaft 43 which project from the frame-sides 20, respectively, and links 45 which are pivoted at 46 to the upper ends of arms 44 and at 47 to the supporting-arms 33. Shaft 38 is continuously driven by power from an electric motor 49 by suitable speed-reducing mechanism, which comprises a pulley 50 on the shaft of the motor, a belt 51 driven by pulley 50, a pulley 52 driven by belt 51 and fixed to a cross-shaft 53 which is journaled in frame-sides 20, a pinion 54 fixed to shaft 53, and a gear 55 meshing with pinion 54 and fixed to the shaft 38 of the eccentric 39. Each revolution of shaft 38 will cause the eccentric 39 to impart a complete back-and-forth working stroke to the carrier 31, cross-head 29, and cutter 27 to cause the cutter-blade to penetrate the rib $a^1$ of the stock during the advance of the cutting-edge 28. The advancing stroke is terminated as the knife-edge reaches the upper face of the web $a$ or the bottom of the ribs $a^1$, so that the slivers will remain integral with the web. The cutter-blade is retracted and raised above the ribs for successive cuts. The work is advanced a distance equal to that desired between the row of spines during the back strokes of the cutter-blade. The blade, being fixed to be advanced and retracted by pivotal movement of arms 33, which are fulcrumed at their lower ends on studs 34, causes the cutting-edge 28 to traverse a slightly curved path, as indicated in Fig. 12. During the advance and retraction of blade 27, it will be operated transversely of the ribs to cause the cutting-edge to move transversely through the ribs $a^2$ and produce a shearing action in raising the spines from the ribs, by sliding the cross-head 29, which carries the knife 27, transversely in its guide 30 in the carrier 31. For this purpose, blocks 57 are secured to the sides of bed 23 (Fig. 7) and are provided with parallel inclined side-faces or tracks 58 and rollers 59 are journaled in blocks 60, which are fixed to the ends of the cross-head 29. During each forward stroke of carrier 31, cross-head 29 and cutter 27, and the inclined faces 58 of blocks 59 will slide the cross-head 29 transversely in one direction and, during the retractile stroke of the knife, will shift the cross-head and knife in reverse direction. This cutting-mechanism is adapted to simultaneously cut a row of spines from all of the ribs $a^1$ during each forward stroke of the knife and then retracts the cutter for a succeeding cutting-stroke during which the sheet of stock is advanced a distance equal to the spacing between the roots of the spines.

During the cutting-stroke of the cutter it is necessary to hold the stock flat and stationary on the work-bed 23 to prevent the unbuckling of the sheet. For this purpose, a pair of vertically reciprocable presser-bars 62, 63 are provided for clamping the sheet flatly on bed 23 rearwardly of the cutter. These bars extend transversely across the machine above the sheet and are forced against the top-faces of the ribs of the sheet to clamp the latter solidly on the bed-plate 23. Bar 62 is carried by a pair of legs 64 which are vertically slidable in guideways formed between frame-sides 20 and the sides of cross-member 21. Presser-bar 63 is provided with legs 65 which are mounted to slide vertically in guideways between cross-member 21 and frame-sides 20. The mechanism for shifting the presser-bars 62, 63 to intermittently clamp the stock against the top-face of work-bed 23 during the cutting-strokes, and to release the stock, comprises a pair of cams 65, which are fixed to rotate with shaft 38, which drives the eccentric 39 for operating the cutter-head; arms 66 which are secured to a cross-shaft 67 which is fulcrumed in the frame-sides 20; links 68 pivoted to the distal end of arms 66 and bell-crank levers 69, respectively, which levers are pivoted at 70 to the upper end of the links 68, a cross-shaft 71 to which levers 69 are fixed, and bars 72 which are mounted for horizontal sliding movement in the sides of cross-members 21, respectively. The upwardly extending members of bell-crank lever 69 are provided with rollers 73 which engage shoulders 74 on bar 72. One end of each of the bars 72 is guided in a bearing 75. The cams 65 impart intermittent horizontal sliding movement to bars 72. Bars 72 are provided with horizontal slots 76 in which are confined rollers 77 which are carried by studs 78 which are fixedly held in the upper ends of toggle-links 79. The lower ends of links 79 are pivoted at 80 to the lower ends of legs 64 on presser-bar 62. Legs 65 of presser-bar 63 are similarly connected to, and shifted by, bar 72. During the initial portion of the advancing stroke of the cutter 27, cams 65 will operate arms 66, links 68, bell-crank levers 69 to shift bars 72 forwardly so that the lower ends of links 78 will be forced downwardly and, through the legs on pressure-bars 62, 63, will force the latter into clamping-engagement with the work. Cam 65 is adapted to hold these presser-bars into such engagement until the cutting-stroke has been completed and to retract bar 72 during the retractile stroke of the cutter so that the presser-bars will release the work for forward feeding movement. Springs 81 are applied to arms 66 to hold link 68 in engagement with cam 65, and to lift the pressure-bars 62, 63 under control of cam 65. Links 68 include turn-buckles 68$^a$ so that the stroke of presser-bars 62 and 63 can be accurately adjusted to clamp the stock on the work-plate 23 and also to adapt them for clamping stock of different thicknesses. Presser-bars 62, 63 clamp the sheet against forward movement by the cutter, which subjects the sheet to tensile stresses.

In addition to clamping the sheet to the bed 23 behind the cutter, it is necessary to clamp the sheet against the bed and in advance of the cutter to prevent the sheet from being buckled in front of the knife during the cutting strokes. For this purpose, a bar 82, the lower edge of which is adapted to be pressed behind the previously cut row of spines, is secured to a cross-head 85, which is reciprocated vertically to intermittently clamp the sheet and permit the row of spines last formed to pass thereunder. Cross-head 85 is secured to the upper ends of legs 86 which are slidably mounted in guideways formed in the sides of cross-member 21. This cross-head is operated vertically by toggle-links 87 which are pivoted at 88 to horizontally reciprocating bars 72 and are connected by studs 89 to the lower ends of legs 86. During each forward stroke of bars 72, cross-head 85 and bar 82 will be lowered and, during the retractile movement of the cutter, they will be raised by links 87. This bar exemplifies means for clamping the sheet forwardly of the cutter and of the row of spines being cut to secure the clamped sheet to the bed 23 at that point during the cutting of the slivers from ribs $a^1$. Slots 76 in bar 72 for studs 77 provide a lost-motion connection which causes bar 72 to impart vertical strokes to head 85 of sufficient length to raise bar 82 above the spines and greater than the strokes of presser-bars 62, 63.

During the cutting-stroke of the cutter, the slivers will be bent into curved contour as the cutting-edge progressively cuts the sliver from the rib, as illustrated in Fig. 10. There is also a tendency of the knife to twist the slivers. In practice, it is desired to have the spines symmetrical and their sides aligned and also to have the points of the spines extend as far as possible from the web of the sheet and, for this purpose, mechanism is provided for shaping or straightening the spines as the cutting-edge of the cutter reaches the end of each cut. This mechanism comprises the vertically reciprocable bar 82, the front of which serves as an anvil against which the slivers are pressed by a coacting bar 83. Bar 82 is reciprocated vertically, as hereinbefore described, to permit the sheet with the raised spines to be fed forwardly under said bar and also to be lowered into position to coact with the bar 83 in shaping the spines. Bar 83 is carried at its ends by arms 84 which are adapted to be swung vertically so it can be shifted into and out of its operative position. Bar 83 is also movable to and from the anvil to cause it to engage the bent slivers and straighten them. The bar 82 is retained in its lowered position during the cutting portion of the forward stroke of the cutter. Arms 84 which carry the bar 83 are pivotally connected to the upper ends of levers 90. The lower ends of levers 90 are fixedly secured to a cross-shaft 91, which is journaled in the side-frames 20. Rocking movement is imparted to levers 90 from the arms 33 which carry the cross-head 29, carrier 31 and the cutter 27 by means of links 92 which are pivoted at 93 to levers 90 and studs 94 on arms 33, respectively, which extend through slots 95 in links 92. Adjustable abutment-screws 96 at one end of slots 95 are engaged by studs 94 at the end of the retractile stroke of the cutter to shift levers 90. The upper ends of levers 90 shift arms 84 horizontally and to move bar 83 to and from the bar 82. Arms 84 to which bar 83 is attached, are provided with inclined slots 97 into which extend stationary studs 98 which are fixed to the frame sides 20 to swing the bar 83 vertically. During the forward stroke of levers 90 slots 97 engaging studs 98 will swing arms 84 to lower the straightening-bar into position behind the slivers, as illustrated in Fig. 10 and also to operate said bar to press the slivers against the anvil face of bar 82 and thus shape the slivers to eliminate the curvature and twist in the slivers as illustrated in Fig. 11. During the end of the retractile stroke of arms 33 and the cutter 27, studs 94 will engage screws 96 and rock arms 90 backwardly, which will cause studs 98 to move the bar 83 upwardly and rearwardly and away from the anvil face of bar 82.

Three pairs of rolls 100 are journaled in the frame-sides 20 and each of said rolls is provided with disks 101 which are adapted to engage the web of the sheet between the raised spines $a^3$. These rolls serve to intermittently advance the sheet a distance equal to the spacing desired between the rows of spines and are also adapted to straighten out any irregularities in the web of the sheet which have resulted from the raising of the spines. The rolls 100 are coactively driven to grip and engage the web of the sheet along three successive lines. The rolls are each provided with gears 102 and are simultaneously driven by idlers 103 between said gears. This gearing is rotated step-by-step to rotate disks 101 and advance the sheet toward the end of the retractile stroke of the cutter 27. This gearing is operated from shaft 91 which is operated by levers 90, links 92 and arms 33, by an arm 104, which is fixed to shaft 91 (Fig. 5) and operates a pawl 105 to engage a ratchet-wheel 106 on the lower feed-roll 100 of the first pair of feed-rolls. A spring 107 is applied to pawl 105 to hold it in engagement with ratchet 106. As the cutter 27 approaches the end of its retractile stroke, arm 104 will be operated to rotate ratchet 106 one step which will, through the gearing 102, 103, simultaneously operate the three pairs of feed-rolls to advance the sheet a distance corresponding to the spacing between the spines, and roll out irregularities in the web $a$ so that before the cutter commences the succeeding forward stroke the sheet will be advanced sufficiently to cause the cutter to penetrate the ribs $a^1$ of the stock and cut the next row of spines, as illustrated in Fig. 12.

In carrying out the method, a sheet of ribbed stock is placed on the work-bed 23 with its front edge immediately beyond the bar 82. The leading ends of the ribs $a^1$ may be shaved off by any suitable means on a line corresponding to the path of the cutter 27 before work is placed in the machine. Assuming the machine to be driven, the presser-bars 62, 65 and 82 will be lowered to clamp the sheet behind and in advance of the cutter so that before the cutter enters the ribs $a^1$, the sheet will be firmly clamped on the work on the bed 23. During the continuation of the forward stroke, the cutter 27 will cut a row of slivers from the ribs along the slightly arcuate lines indicated at c in Fig. 12. The cutter will be shifted transversely to produce a shearing action. As the cutter advances, the slivers will be bent upwardly and forwardly, as illustrated in Fig. 10, and some twisting thereof will result. As the cutter approaches the end of its forward stroke, studs 94 on arms 33, will operate links 92, levers 90, and arms 84 to move the bar 83 downwardly and forwardly and press the slivers against the anvil face of the bar 82 and shape or flatten them. During the succeeding retractile stroke of the cutter, the presser-bars 62, 64 and 82 will be raised to release the sheet and bar 82 will be raised to permit the spines to pass under it. Toward the end of the retractile stroke of the cutter, the studs 94 will engage screw 96 and operate links 92 to raise bar 83 into position to permit the succeeding row of slivers, as they are being initially cut, to pass in front of said bar, and simultaneously arm 104 will operate pawl 105 to rotate the rolls 100 correspondingly to the distance between the roots of the spines, and to advance the sheet into position for the succeeding cut along line c (Fig. 12). These rolls will also straighten out any irregularities in the web of the sheet.

In cutting the initial rows of spines, the sheet may be fed manually until the front edge of the work passes into the bite of the feed-rolls or, a dummy sheet can be hooked to the front edge of the ribbed sheet to pull the latter step-by-step until it passes into the bite of the first pair of feed-rolls.

The invention exemplifies a method by which integral spines of sufficient length for high efficiency in heat transfer are raised from metal sheets for use in fabricating heat-transfer structures or walls, and by which rows of spines are simultaneously cut from ribbed sheets. This produces a method for a high ratio of production of sheets with integral spines. The method also provides means for shaping the spines after they have been raised from the sheet so they will be uniform in shape or parallel, for the flow of fluid between the spines.

This application is a division of application Serial No. 318,097 filed by me February 9, 1940.

The invention is not to be understood as restricted to the details set forth, since these may be modified within the scope of the appended claims, without departing from the spirit and scope of the invention.

Having thus described the invention, what I claim as new and desire to secure by Letters Patent is:

1. That improvement in the manufacture of heat transfer walls from a thin flat sheet of stock having parallel ribs on one of its faces which comprises making successive cuts while the sheet is flat, each cut being made transversely and simultaneously in a common plane through the entire series of ribs on the ribbed face and being of gradually increasing depth and extending longitudinally of the ribs to produce a row of slivers and bending the slivers away from the plane of the sheet during each cut to form a row of upstanding spines integral with the sheet, the successive cuts being overlapping longitudinally of the ribs to produce spines of greater length than the spacing between the roots of the spines of successive rows.

2. That improvement in the manufacture of heat transfer walls from a thin flat sheet of stock having parallel ribs on one of its faces which comprises making successive cuts while the sheet is flat, each cut being made transversely and simultaneosly in a common plane through the entire series of ribs on the ribbed face and of gradually increasing depth substantially to the base of the ribs and extending longitudinally of the ribs to produce a row of slivers and bending the slivers away from the plane of the sheet during each cut to form a row of upstanding spines integral with the sheet, the successive cuts being overlapping longitudinally of the ribs to produce spines of greater length than the spacing between the roots of the spines of successive rows.

3. That improvement in the manufacture of heat transfer walls from a thin sheet of stock having substantially parallel ribs on one of its faces which comprises firmly and intermittently clamping a portion of the sheet so it will remain flat and stationary, making successive cuts which extend away from the clamped portion of the sheet and subjecting the remainder of the sheet to tension, each cut being of gradually increasing depth longitudinally of, and transversely through, the ribs, and bending the slivers during each cut away from the plane of the sheet to form a row of upstanding spines integral with the sheet.

4. That improvement in the manufacture of heat transfer walls from a thin sheet of stock having substantially parallel ribs on one of its faces which comprises firmly and intermittently clamping a portion of the sheet so it will remain flat and stationary, making successive cuts, in the unclamped portion of the sheet in a direction which subjects the unheld portion of the sheet to tension, each cut extending longitudinally of, and transversely through, the ribs, and bending the slivers during each cut away from the plane of the sheet to form a row of upstanding spines integral with the sheet.

HAROLD G. BARRETT.